(12) United States Patent
Yang et al.

(10) Patent No.: US 7,902,881 B2
(45) Date of Patent: Mar. 8, 2011

(54) OUTPUT SIGNAL GENERATING DEVICE INCLUDING OUTPUT SIGNAL DETECTING UNIT

(75) Inventors: Chongshan Yang, Mie (JP); Hiroshi Ozaki, Yokohama (JP); Kazuya Yasui, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 12/159,192

(22) PCT Filed: Dec. 12, 2006

(86) PCT No.: PCT/JP2006/324739
§ 371 (c)(1),
(2), (4) Date: Sep. 4, 2008

(87) PCT Pub. No.: WO2007/074636
PCT Pub. Date: Jul. 5, 2007

(65) Prior Publication Data
US 2010/0225359 A1 Sep. 9, 2010

(30) Foreign Application Priority Data
Dec. 27, 2005 (JP) .............................. P 2005-375995

(51) Int. Cl.
*H03K 3/00* (2006.01)
(52) U.S. Cl. .......................... 327/108; 361/56
(58) Field of Classification Search .................. 327/108; 361/56, 91.2
See application file for complete search history.

(56) References Cited

U.S. PATENT DOCUMENTS

| | | | | | |
|---|---|---|---|---|---|
| 4,576,253 | A | * | 3/1986 | Tanahashi et al. | 187/296 |
| 5,539,608 | A | * | 7/1996 | Hurley et al. | 361/152 |
| 6,011,416 | A | * | 1/2000 | Mizuno et al. | 327/108 |
| 6,175,484 | B1 | * | 1/2001 | Caruthers et al. | 361/159 |
| 7,057,870 | B2 | * | 6/2006 | Meyer et al. | 361/139 |
| 7,274,548 | B2 | * | 9/2007 | Ogawa | 361/93.2 |

FOREIGN PATENT DOCUMENTS

| | | |
|---|---|---|
| JP | 58-116075 A | 7/1983 |
| JP | 60-023268 A | 2/1985 |
| JP | 64-043068 A | 2/1989 |
| JP | 6-169575 A | 6/1994 |
| JP | 8-019263 A | 1/1996 |
| JP | 2002-084760 A | 3/2002 |

* cited by examiner

*Primary Examiner* — Kenneth B. Wells
(74) *Attorney, Agent, or Firm* — Foley & Lardner LLP

(57) ABSTRACT

An output signal generating device according to the present invention includes a control circuit for generating a control signal, a reference signal generating unit for generating a reference signal, an output signal generating unit for generating an output signal according to a comparison result between the control signal and the reference signal, an output signal detecting unit for detecting the output signal based on a sampling signal, and an output signal storage unit for storing the output signal detected by the output signal detecting unit. The control circuit includes a readout unit for reading out the output signal stored in the output signal storage unit. According to the present invention, the output signal can be stored in real time and the results thereof can be processed by software.

3 Claims, 5 Drawing Sheets

OUTPUT SIGNAL GENERATING DEVICE INCLUDING OUTPUT SIGNAL DETECTING UNIT

TECHNICAL FIELD

The present invention relates to an output signal generating device with a function of accumulating output signals as information and reading out the accumulated information.

BACKGROUND ART

FIG. 9 shows a configuration of a conventional output signal generating device. This output signal generating device is applied, for example, to an apparatus that generates a signal for a motor inverter. The conventional output signal generating device is described with reference to FIG. 9 hereinafter. The output signal generating device includes a control circuit 100, a reference signal generating unit 102 and an output signal generating unit 104. The control circuit 100 and the reference signal generating unit 102 are connected to the output signal generating unit 104, respectively. The control circuit 100 outputs a control signal a such as a software command signal. The reference signal generating unit 102 outputs a reference signal b. The output signal generating unit 104 is composed of, for example, a comparator or the like and generates a signal corresponding to a comparison result between the control signal a and the reference signal b to output the generated signal as an output signal c.

FIG. 10 shows signal waveforms of respective units in FIG. 9 and timings. The following calculations are made in order to ascertain a state of the output signal c with implemented software in the control circuit 100.

Time for which the output signal c stays a high state $$T_{hi} = T1 + T - T2$$

Time for which the output signal c stays a low state $$T_{low} = T2 - T1$$

The number of the output signals c increases, so that the above mentioned calculation process amount may increase. Therefore, as frequency of the output signal increases, the calculation process cycle of the software must be shorter.

In addition, a related art of an output signal generating device is also disclosed in Japanese Patent Application Laid-Open No. H8-19263 (Patent Document 1), for example. In this Patent Document 1, disclosed is a current detecting device with a PWM inverter type current detection. This current detecting device detects a DC-side current with one current sensor to detect an output current of each phase and calculates the difference of the DC-side current between pre- and post-switching per each phase. This makes it possible to detect the output current with the one current sensor although a plurality of current sensors have been required heretofore.

Also in Japanese Patent Application Laid-Open No. 2002-84760 (Patent Document 2), disclosed is an invention of a phase current calculation unit for calculating a phase current together with the configuration of the invention in the Patent Document 1. This phase current calculation unit calculates a phase current with a DC bus current value and a 3-phase voltage state on the timing of the current detection based on the fact that an inner product of a phase current vector and a phase voltage vector is identical to a DC busbar current. Since the invention in the Patent Document 2 makes it possible to obtain all phase currents at the time when two kinds of non-zero voltage vectors that certainly present during one PWM cycle are output, detection frequency of the DC bus current can be reduced.

The invention disclosed in each of the Patent Documents 1 and 2 relates to an output current detecting device for a PWM inverter and mainly aims at 3-phase current calculations at low cost and with small detection frequency.

Patent Document 1: Japanese Patent Application Laid-Open No. H8-19263

Patent Document 2: Japanese Patent Application Laid-Open No. 2002-84760

DISCLOSURE OF THE INVENTION

However, since the conventional output signal generating device shown in FIG. 9 is not provided with a detecting unit for detecting a signal output from the output signal generating unit 104, it is necessary to ascertain a state of the actual output signal by a software calculation process. Therefore, software process loads increase and it is difficult to ascertain an influence due to delay of the actual output signal. Furthermore, it becomes more difficult to ascertain the state of the output signal as the number of and the frequency of the output signal increase.

In addition, each of the inventions in the Patent Documents 1 and 2 relates to the 3-phase current calculations at low cost and with small detection frequency and achieves the reduction of cost and detection frequency by detecting a DC current flowing into a switching element. However, the software process loads may increase in the calculation process and also this technique is applicable only to PWM inverters.

DISCLOSURE OF THE INVENTION

The present invention has been achieved to solve the above problems in the prior art and its object is to provide an output signal generating device that can store an output signal in real time and the result thereof can be processed by software.

The output signal generating device according to the present invention includes a control circuit for generating a control signal, a reference signal generating unit for generating a reference signal, an output signal generating unit for generating an output signal according to a comparison result between the control signal and the reference signal, an output signal detecting unit for detecting the output signal based on a sampling signal, and an output signal storage unit for storing the output signal detected by the output signal detecting unit. The control circuit includes a readout unit for reading out the output signal stored in the output signal storage unit.

By this configuration, an output signal generating device can be provided which can store an output signal in real time and process the result thereof by software. Accordingly, it becomes possible to ascertain an output value generated by hardware circuitry according to a software command without software calculations. As a result, it is possible to ascertain an actual output value including delays of the hardware circuitry which are difficult to predict using software calculations. In addition, it is possible to prevent shifts of ascertaining timing caused by software calculation delays.

It is preferable that the control circuit, the reference signal generating unit, the output signal generating unit, the output signal detecting unit and the output signal storage unit are configured by a microprocessor implemented on a single chip.

Since noise influence becomes less by containing the control circuit, the reference signal generating unit, the output signal generating unit, the output signal detecting unit and the output signal storage unit on a single chip as compared to the case where these units are provided as external circuitry of the control circuit, data reliability is improved.

It is also preferable that the output signal storage unit has a primary storage unit for storing the output signal detected by the output signal detecting unit, a trigger signal generating unit for generating a trigger signal, a secondary storage unit for receiving and successively storing the output signal information stored in the primary storage unit (the output signal information is to be read by the readout unit), and a transfer control unit for controlling transferring timing of the output signal information from the primary storage unit to the secondary storage unit based on the trigger signal.

According to this, since data transferring timing from the primary storage unit to the secondary storage unit can be controlled, it is possible to ascertain the state of the output signal in accordance with required timing. In addition, since the primary and secondary storage units are provided and the data are read and written simultaneously, processing speed and protection of data can be improved.

Furthermore, it is also preferable that the control circuit generates a software-based PWM control signal as the control signal, the reference signal generating unit generates a triangular wave signal, a saw tooth signal or a delta modulation signal, as the reference signal, and the output signal generating unit generates a PWM output signal as the output signal.

According to this, an actual PWM output signal can be ascertained more quickly with less software process loads than the prior method of calculating to estimate the PWM output signal by software. In addition, the PWM output signal can be ascertained even when the number of PWM output signals or the frequency of PWM output signal increases. This has been difficult to achieve in the prior art due to the limitation of processing capacity.

BEST MODE(S) FOR CARRYING OUT THE INVENTION

Hereinafter, embodiments of an output signal generating device according to the present invention will be explained in detail based on the drawings.

First Embodiment

Figure 1:
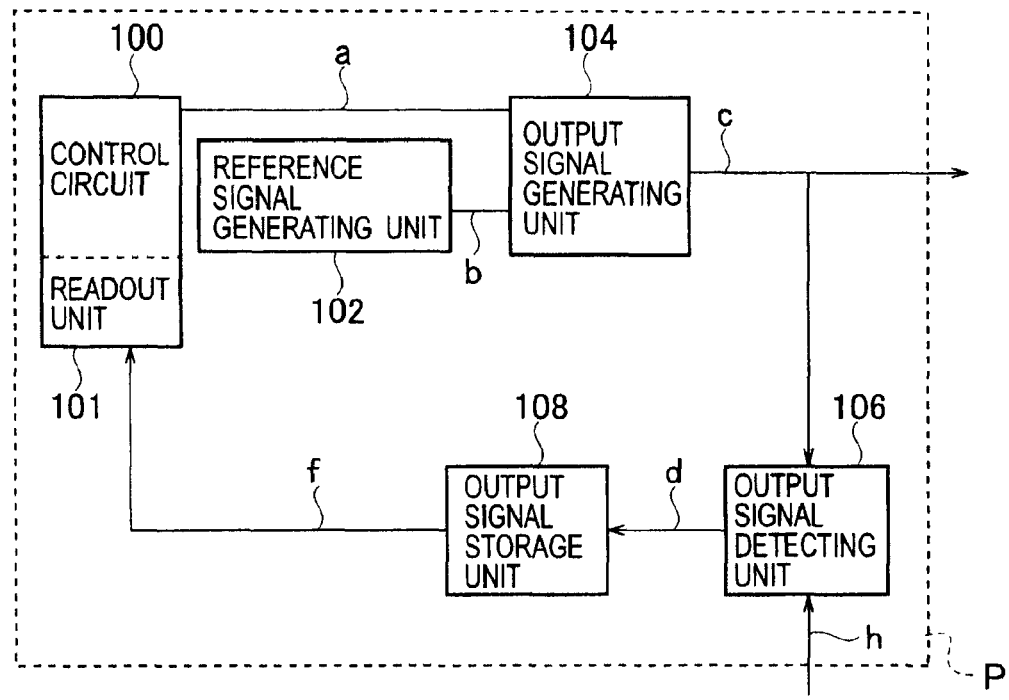
FIG. 1 is a block diagram of an output signal generating device according to a first embodiment of the present invention.
Figure 2:
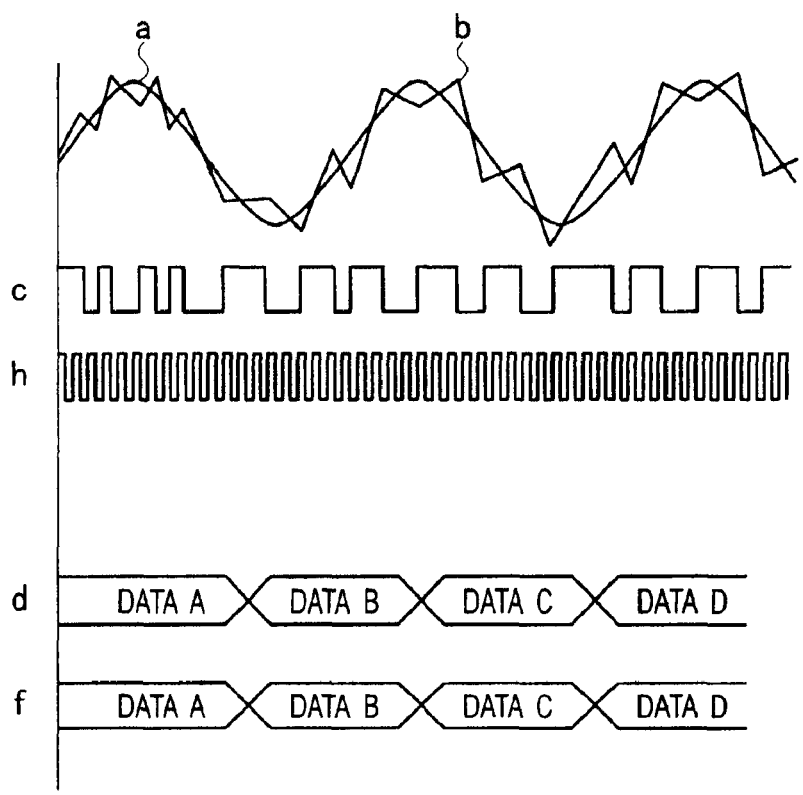
FIG. 2 is a signal waveform chart showing signal waveforms of respective units in the first embodiment of the present invention.

An embodiment of the present invention will be explained below with reference to the drawings. FIG. 1 is a block diagram of a first embodiment and FIG. 2 is a signal waveform chart of respective units shown in FIG. 1. Note that, in FIGS. 1 and 2 and the after-mentioned drawings showing other embodiments, elements identical or equivalent to those in FIGS. 9 and 10 are allocated with identical reference numerals to omit repetitive explanations thereof.

Figure 9:
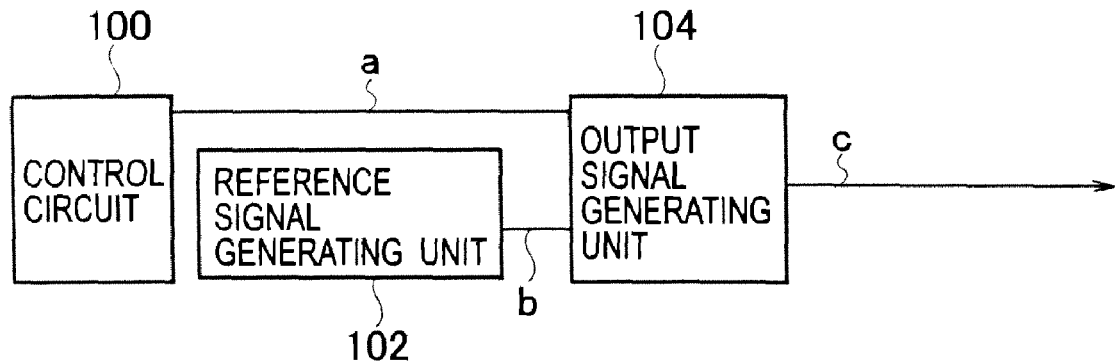
FIG. 9 is a block diagram of a conventional output signal generating device.
Figure 10:
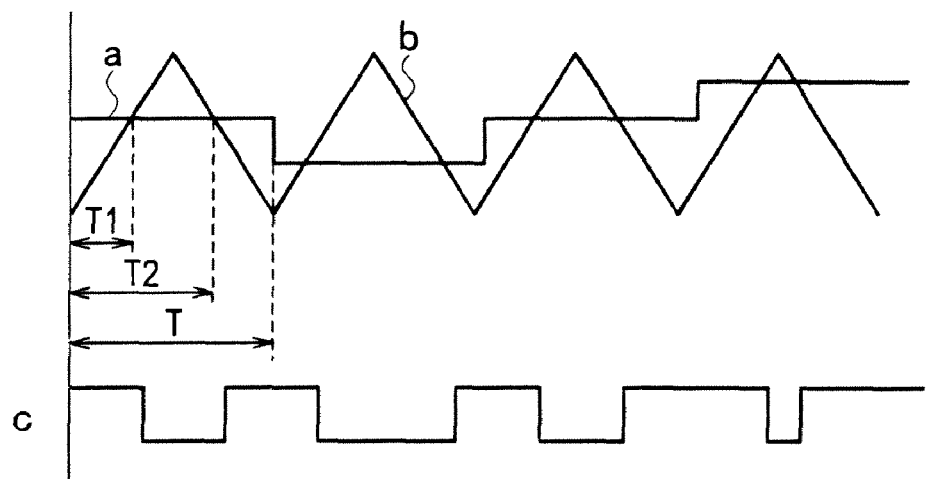
FIG. 10 shows signal waveforms of respective units and timings in the conventional output signal generating device.

An output signal generating device according to the first embodiment includes an output signal detecting unit 106 and an output signal storage unit 108 in addition to the configuration of the prior art shown in FIG. 9. Outputs of the output signal generating unit 104 are input to the output signal detecting unit 106. The output signal detecting unit 106 is connected to the output signal storage unit 108. The output signal storage unit 108 is connected to the control circuit 100.

Next, operations of the output signal generating device according to the first embodiment will be explained. In FIG. 1, a process of the output signal generating unit 104 generating the output signal c (PWM output signal) is the same as that in the prior art shown in FIG. 9. Further, the output signal detecting unit 106 detects the output signal c based on a sampling signal h with a higher frequency than that of the reference signal b. The output signal detecting unit 106 converts the sampled output signal c to software-processable data and outputs the data as an output stored signal d. The output signal storage unit 108 stores this output stored signal d. In addition, the control circuit 100 includes a readout unit 101 for reading out the output stored signal d as output data f in a software-processable format. The control circuit 100, the reference signal generating unit 102, the output signal generating unit 104, the output signal detecting unit 106 and the output signal storage unit 108 are configured as a microprocessor P implemented on a single chip.

Signal waveforms of respective units shown in FIG. 2 will be explained. The output signal c is generated as a comparison result between the control signal a and the reference signal b. Difference between the control signal a and the reference signal b as a predictive control signal is examined. And then the output signal c (PWM output signal) is output as a positive constant output while the control signal a is larger or as a negative constant output while the control signal a is smaller. The sampling signal h is a sampling signal for the output signal detecting unit 106 and the frequency thereof is higher than that of the output signal c. Therefore, sampling can be achieved with the output signal being kept by the sampling signal h. The output signal detecting unit 106 converts the sampled output signal to software-processable data and transfers the data to the output signal storage unit 108 as the output storage signal d. Therefore, software on the control circuit 100 can ascertain the output signal in real time due to the output signal detecting unit 106.

As described above, the output signal generating device according to the first embodiment can store the output signal in real time and process the results thereof using software.

Therefore, it is possible to ascertain an output value 10 generated by hardware circuitry according to a software command without software calculations. As a result, it is possible to ascertain an actual output value including the hardware circuitry delays that are difficult to predict using software calculations. In addition, it is possible to execute the control with high accuracy by preventing shifts of ascertaining timings caused by software calculation delays.

Second Embodiment

Figure 3:
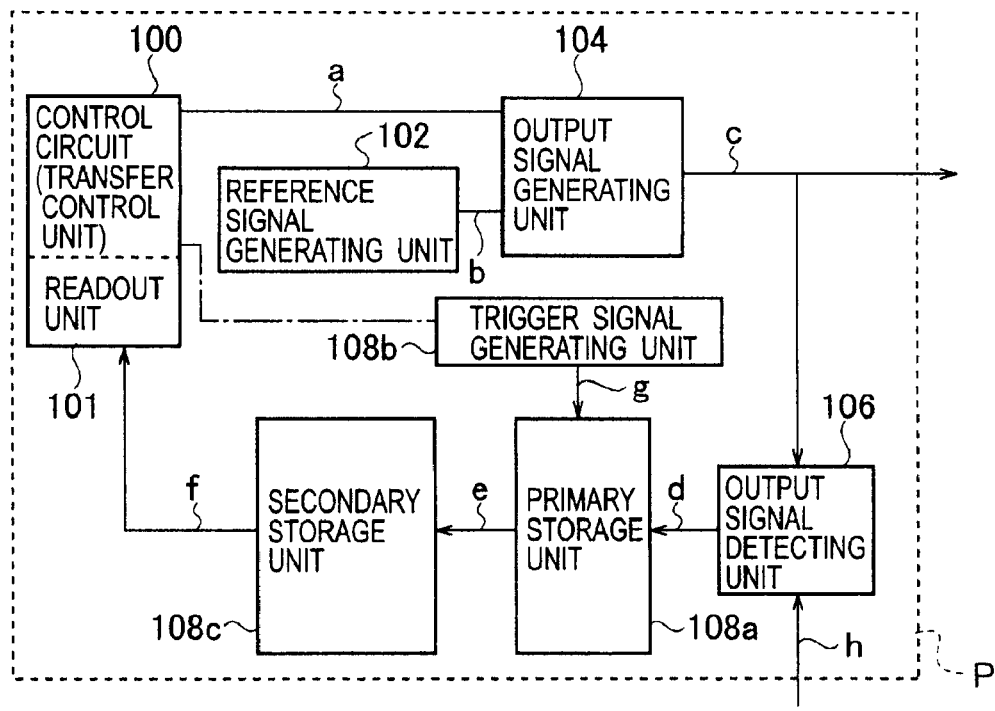
FIG. 3 is a block diagram of an output signal generating device according to a second embodiment of the present invention.
Figure 4:
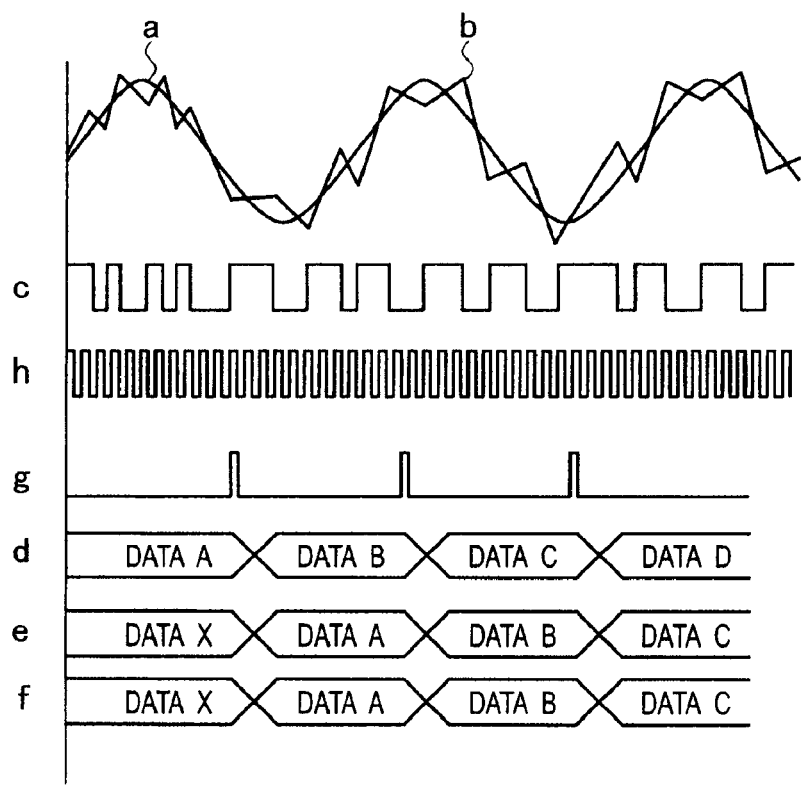
FIG. 4 is a signal waveform chart showing signal waveforms of respective units in the second embodiment of the present invention.

Next, FIG. 3 is a block diagram showing a configuration according to a second embodiment and FIG. 4 is a signal waveform chart of respective units in FIG. 3. It is different from the first embodiment in that a primary storage unit 108a, a trigger signal generating unit 108b, and a secondary storage unit 108c are provided as the output signal storage unit.

Next, operations of an output signal generating device according to the second embodiment will be explained. In FIG. 3, processes until the output signal detecting unit 106 generating the output storage signal d are the same as those in the first embodiment. The primary storage unit 108a stores the output storage signal d from the output signal detecting unit 106. The trigger signal generating unit 108b can control transferring timing of data e from the primary storage unit 108a to the secondary storage unit 108c by generating a trigger signal g. In addition, the software implemented in the control circuit 100 can read and process the data in the secondary storage unit.

Signal waveforms of respective units shown in FIG. 4 will be explained. Processes until the output signal detecting unit 106 detecting the output signal c with the sampling signal h are the same as those in the first embodiment. The output signal detecting unit 106 samples the output signal via the sampling signal h. The output signal detecting unit 106 converts the sampled output signal to software-processable data and transfers the data to the primary storage unit as the output storage signal d. The primary storage unit 108a stores the transferred output storage signal d. The trigger signal generating unit 108b controls transferring timing of the data e from the primary storage unit 108a to the secondary storage unit 108c based on the trigger signal g. In addition, the control circuit 100 includes the readout unit 101 for reading out the output data f from the secondary storage unit 108c at the same timing as the transferring timing. At the same time, the primary storage unit 108a stores new data. The reference signal generating unit 102, the output signal generating unit 104, the output signal detecting unit 106 and an output signal storage unit (described later) are configured as a microprocessor P implemented on a single chip. In addition, here, the control circuit 100 serves as a transfer control unit that controls transferring timing of information from the primary storage unit 108a to the secondary storage unit 108c based on the trigger signal g. Note that, here, the output signal storage unit is composed of the primary storage unit 108a, the trigger signal generating unit 108b, the secondary storage unit 108e and the transfer control unit (the control circuit 100).

As described above, similarly to the first embodiment, the output signal generating device according to the second embodiment can store the output signal in real time and process the results thereof by software. In addition, since the output signal generating device can control data transferring timing from the primary storage unit 108a to the secondary storage unit 108e, it is possible to ascertain the state of the output signal c in accordance with required timing. Furthermore, since the output signal generating device includes the primary storage unit 108a and the secondary storage unit 108e, processing speed can be enhanced by simultaneous data reading and writing and to protect data by the data transfer to the secondary storage unit 108e.

Third Embodiment

Figure 5:
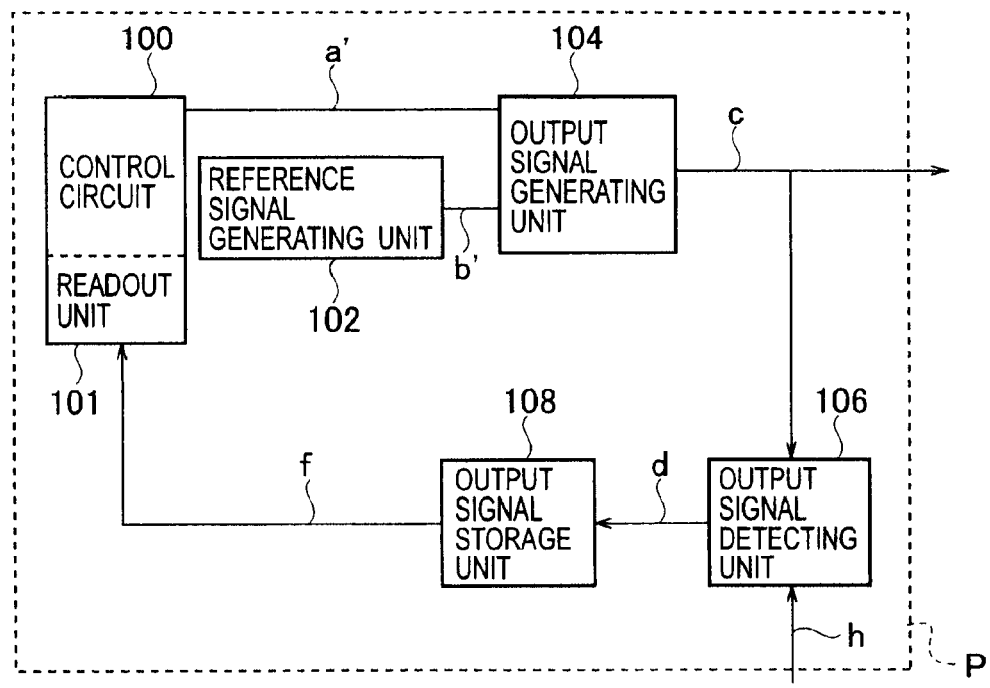
FIG. 5 is a block diagram of an output signal generating device according to a third embodiment of the present invention.
Figure 6:
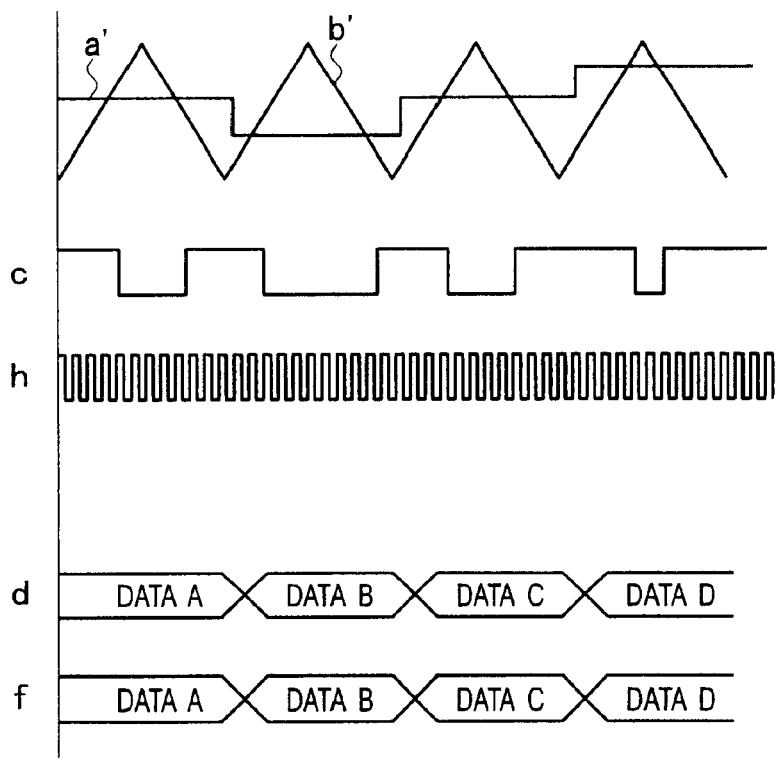
FIG. 6 is a signal waveform chart showing signal waveforms of respective units in the third embodiment of the present invention.

Next, FIG. 5 is a block diagram showing a configuration according to a third embodiment and FIG. 6 is a signal waveform chart of respective units in FIG. 5. It is different from the first embodiment in that the control signal a in the first embodiment corresponds to a PWM control signal a' and the reference signal b in the first embodiment corresponds to a triangular wave signal b'. Other configurations are the same as those in the first embodiment, so that detailed explanations thereof will be omitted.

Next, operations of an output signal generating device according to the third embodiment will be explained with reference to FIG. 6. The control signal a and the reference signal b in FIG. 2 (the first embodiment) correspond to the PWM control signal a' and the triangular wave signal b' in FIG. 6, respectively. The triangular wave signal b' herein takes positive and negative polarities in turns every half period with constant amplitude and constant frequency. The reference signal may be a saw tooth signal. The saw tooth signal is a triangular wave signal of which a rise time and a fall time are greatly different from each other and is a form of triangular wave signals. The output signal generating unit 104 generates a PWM output signal c by comparing the triangular wave signal b' and the PWM control signal a' as the control signal. Specifically, as the PWM control signal c, an ON signal is generated as the PWM control signal c while the PWM control signal a' is larger than the triangular wave signal b' or an OFF signal is generated when it is smaller. The output signal generating unit 104 can control an inverter (not shown) according to a PWM method by inputting the PWM output signal c to the inverter. In this case, if the PWM control signal a' takes a sine wave form, the inverter output voltage can be changed by controlling the PWM output signal c with the sine wave amplitude being changed.

As described above, similarly to the first embodiment, the output signal generating device according to the third embodiment can store the output signal c in real time and process the results thereof by software. In addition, the output signal generating device can ascertain an actual PWM output signal more quickly with less software process loads than the prior method of calculating to estimate the PWM output signal by software. Therefore, if the PWM output signal is applied to a motor inverter for a motor, the motor is controlled accurately by monitoring the output signal to the inverter. Furthermore, the output signal generating device according to the third embodiment can ascertain the PWM output signal even when the number of PWM output signals or the frequency of PWM output signal increases. It has been difficult by the prior art due to the limitation of processing capacity.

Fourth Embodiment

Figure 7:
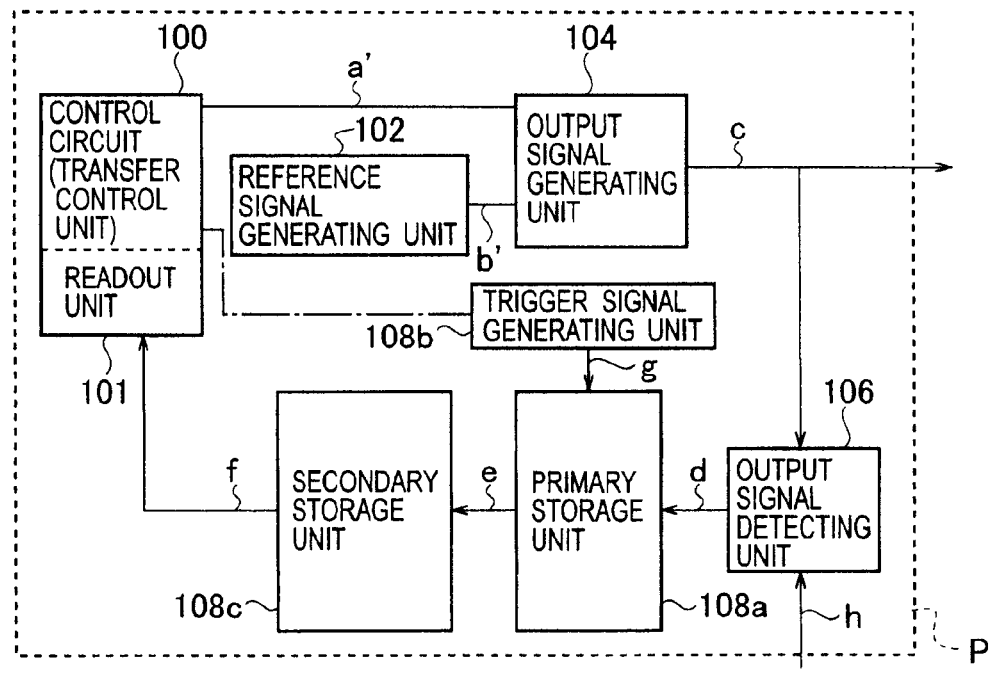
FIG. 7 is a block diagram of an output signal generating device according to a fourth embodiment of the present invention.
Figure 8:
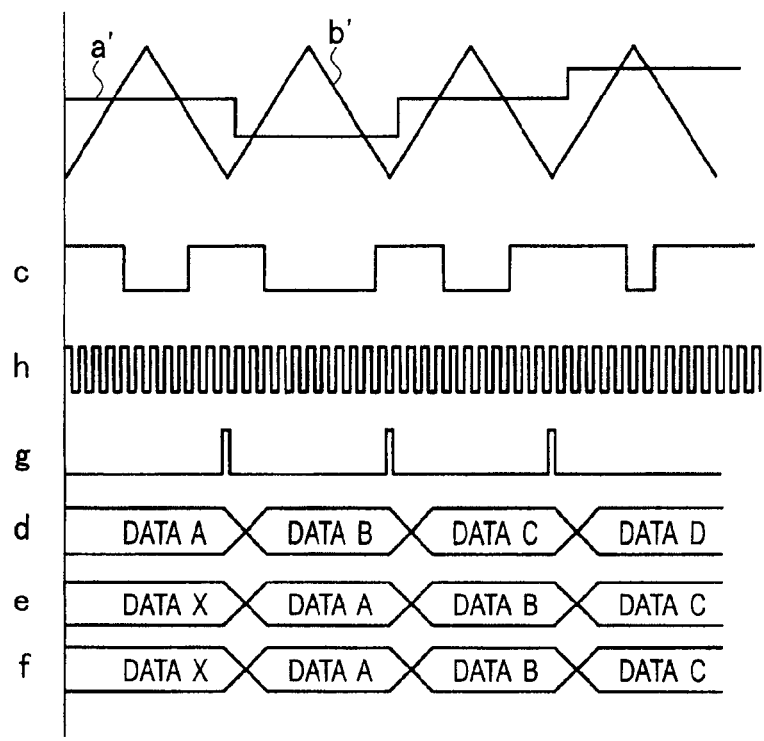
FIG. 8 is a signal waveform chart showing signal waveforms of respective units in the fourth embodiment of the present invention.

Next, FIG. 7 is a block diagram showing a configuration according to a fourth embodiment and FIG. 8 is a signal waveform chart of respective units in FIG. 7. It is different from the second embodiment in that the control signal a in the second embodiment corresponds to a PWM control signal a' and the reference signal b in the second embodiment corresponds to a triangular wave signal b'. Other configurations in the fourth embodiment are the same as those in the second embodiment, so that detailed explanations thereof will be omitted.

Next, operations of an output signal generating device according to the fourth embodiment will be explained with reference to FIG. 8. The control signal a and the reference signal b in FIG. 4 (the second embodiment) correspond to the PWM control signal a' and the triangular wave signal b' in FIG. 8, respectively. Other configurations are the same as a combination of those in the second and third embodiments, so that detailed explanations thereof will be omitted. As a result, the output signal detecting unit 106 can store the PWM output signal in real time and the software implemented in the control circuit 100 can read and process the data. Furthermore, the trigger signal generating unit 108b can control the transferring timing of the data e from the primary storage unit 108a to the secondary storage unit 108c based on the trigger signal g.

As described above, similarly to the first embodiment, the output signal generating unit according to the fourth embodiment can store the output signal c in real time and process the results thereof by software. In addition, the output signal generating device can ascertain an actual PWM output signal more quickly with less software processing loads than the prior method of calculating to estimate the PWM output signal by software. Furthermore, similarly to the second embodiment, since the output signal generating device can control data transferring timing from the primary storage unit to the secondary storage unit, it is possible to ascertain the state of the output signal in accordance with required timing. Furthermore, since it includes the primary storage unit and the secondary storage unit, processing speed and protection of data can be improved.

INDUSTRIAL APPLICABILITY

The output signal generating device according to the present invention can be utilized for controlling PWM inverters.

The invention claimed is:

1. An output signal generating device comprising:
   a control circuit for generating a control signal;
   a reference signal generating unit for generating a reference signal;
   an output signal generating unit for generating an output signal according to a comparison result between the control signal and the reference signal;
   an output signal detecting unit for detecting the output signal based on a sampling signal; and
   an output signal storage unit for storing the output signal detected by the output signal detecting unit,
   wherein the control circuit includes a readout unit for reading out the output signal stored in the output signal storage unit,
   wherein the output signal storage unit includes:
      a primary storage unit for storing the output signal detected by the output signal detecting unit;
      a trigger signal generating unit for generating a trigger signal;
      a secondary storage unit for receiving and successively storing information on the output signal stored in the primary storage unit, the information on the output signal being to be read by the readout unit; and
      a transfer control unit for controlling transferring timing of the output signal information from the primary storage unit to the secondary storage unit based on the trigger signal.

2. The output signal generating device according to claim 1, wherein
   the control circuit, the reference signal generating unit, the output signal generating unit, the output signal detecting unit and the output signal storage unit are configured as a microprocessor implemented on a single chip.

3. The output signal generating device according to claim 1, wherein
   the control circuit generates a software-based PWM control signal as the control signal,
   the reference signal generating unit generates a triangular wave signal, a saw tooth signal or a delta modulation signal, as the reference signal, and
   the output signal generating unit generates a PWM output signal as the output signal.

* * * * *